US006879943B1

(12) United States Patent
Shigemori

(10) Patent No.: US 6,879,943 B1
(45) Date of Patent: Apr. 12, 2005

(54) DOCUMENT PROCESSING APPARATUS AND METHOD

(75) Inventor: Yuriyo Shigemori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/425,733

(22) Filed: Oct. 22, 1999

(30) Foreign Application Priority Data

Oct. 27, 1998 (JP) .......................................... 10-306155

(51) Int. Cl.$^7$ ............................................ G06F 17/10
(52) U.S. Cl. ............................ 703/2; 355/55; 345/660; 715/517
(58) Field of Search ............................ 703/2; 355/55; 345/660; 715/517–525

(56) References Cited

U.S. PATENT DOCUMENTS

| | | | | |
|---|---|---|---|---|
| 4,743,947 A | * | 5/1988 | Yamamoto | 399/188 |
| 4,754,303 A | * | 6/1988 | Ito | 355/55 |
| 4,758,866 A | * | 7/1988 | Ito | 355/55 |
| 5,311,259 A | * | 5/1994 | Moriya et al. | 358/1.2 |
| 5,449,241 A | * | 9/1995 | Matsui et al. | 400/314 |
| 5,479,593 A | * | 12/1995 | Brewer et al. | 345/441 |
| 5,954,436 A | * | 9/1999 | Kageyama et al. | 358/1.12 |
| 5,973,721 A | * | 10/1999 | Bergmans et al. | 347/262 |
| 6,021,284 A | * | 2/2000 | Serizawa et al. | 399/16 |

OTHER PUBLICATIONS

Microsoft Publisher by Design, by Luisa Simone, Microsoft Press, 1994, pp. 190–192, and 403.*
The Computer Science and Engineering Handbook, by Allen B. Tucker, CRC Press, ISBN: 0–8493–2909–4, 1996, pp. 203–204.*
Mechanical Desktop 2.0 Applying Designer and Assembly Modules, by Daniel T. Banach, Autodesk Press, ISBN: 0–7668–0068–7, Jun. 1998, pp. 213, and 221–228.*
New Rider's Reference Guide to AutoCAD 13, by Randall A. Maxey and Erik W. Olson, © 1995 by New Rider's Publishing, ISBN 1–56205–237–3, p. 1, 2, 63, 64, 339, 591, and 642.*

* cited by examiner

Primary Examiner—Kevin J. Teska
Assistant Examiner—Eduardo Garcia-Otero
(74) Attorney, Agent, or Firm—Fitzpatrick, Cella, Harper & Scinto

(57) ABSTRACT

This invention is to provide an information processing system and method in which when the paper size of a document is to be changed, layout constituent elements are rearranged while keeping margin sizes unchanged and keeping a predetermined ratio between the shape of the effective area and the shape of each layout constituent element, thereby freely and easily setting the shape of each object frame as a layout constituent element without entering the binding margin or the physical printing disable area. In rearranging a plurality of layout constituent elements in a document on the basis of an instruction for changing the paper size of the document, the effective area size of the document after the change in paper size is calculated. On the basis of the calculated effective area size, the size and position of each layout constituent element are calculated such that a margin of the document becomes constant before and after the change in paper size. The layout constituent elements before the change are rearranged in accordance with the calculated size and position of each layout constituent element after the change in paper size. The rearranged document is printed out.

6 Claims, 10 Drawing Sheets

W41 : H41 = W42 : H42

W51a/W51b=W52a/W52b
H51a/H51b=H52a/H52b

W61a : W61b=W62a : W62b
H61a : H61b=H62a : H62b nTH SURFACE, (n+1)TH SURFACE
W101a : W101b=W102a : W102b
H101a : H101b=H102a : H102b

DOCUMENT PROCESSING APPARATUS AND METHOD

BACKGROUND OF THE INVENTION

1. Field of the Invention

The present invention relates to a document processing method and apparatus for rearranging a plurality of layout constituent elements in a document on the basis of an instruction for changing the paper size of the document.

2. Description of the Related Art

Conventionally, when the paper size is changed, layout constituent elements in paper are rearranged such that the layout constituent elements (object frames or character sizes) after the change in paper size become similar to those before the change, or the ratio between the paper shape and the shape of each layout constituent element remains constant. The former is the DTP of a word processor or the like, in which margin sizes are changed to make the shape of the printing enable range after the change in paper size similar to that before the change, and the layout constituent elements within that range are also deformed such that they become similar. The latter is used to deform image data or a template, in which margin sizes before and after the change in paper size are neglected, and the aspect ratio between the paper shape and the shape of each layout constituent element in the paper is kept uniform.

These rearranging techniques will be described below in more detail with reference to FIGS. 1 and 2. FIG. 1 shows an example in which the paper size of a template formed from four slots is changed such that the shape of each layout, constituent element after the change is kept similar to that before the change. The slots are similar when, for the width and height of the upper left slot in FIG. 1, "W41/H41=W42/H42" is satisfied.

FIG. 2 shows an example in which the paper size of a template formed from four slots is changed such that the ratio between the paper shape and the shape of each layout constituent element remains constant. The ratio between the paper shape and the slot shape remains constant when, for the width and height of the upper left slot in FIG. 2, "W51$a$/W51$b$=W52$a$/W52$b$, H51$a$/H51$b$=H52$a$/H52$b$" is satisfied.

However, in the method shown in FIG. 1 or 2, since margin sizes are neglected, the layout constituent elements may enter the binding margin or a physical printing disable area.

SUMMARY OF THE INVENTION

The present invention has been made to solve the above problem, and has as its object to provide a document processing method and apparatus in which when the paper size of a document is changed, layout constituent elements are rearranged while keeping margin sizes unchanged and keeping a predetermined ratio between the shape of the effective area and the shape of each layout constituent element, thereby freely and easily setting the shape of each object frame as a layout constituent element without entering the binding margin or the physical printing disable area.

It is another object of the present invention to provide a document processing method and apparatus in which when the paper size is changed, the user can switch the shapes of layout constituent elements between a mode "keeping the aspect ratios of the slots" and a mode "keeping constant margin sizes" in accordance with the purpose.

According to the present invention, there is provided a document processing apparatus for changing a layout of a plurality of layout constituent elements in a document in changing a paper size, comprising first calculation means for calculating an effective area size of the document after the change in paper size; and second calculation means for calculating a size and position of each layout constituent element after the change in paper size on the basis of the effective area size calculated by the first calculation means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The embodiments of the present invention will be described below in detail with reference to the accompanying drawings.

[Arrangement of Information Processing System]

Figure 1:
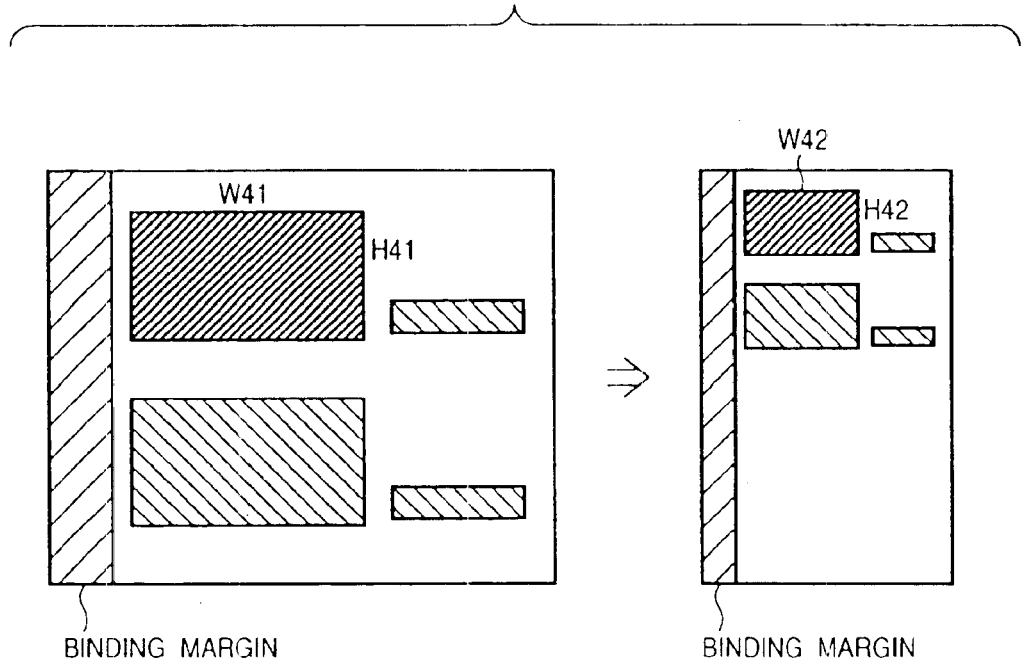
FIG. 1 is a view showing an example wherein the paper size of a template formed from four slots is changed such that the shape of each layout constituent element after the change becomes similar to that before the change.
Figure 2:
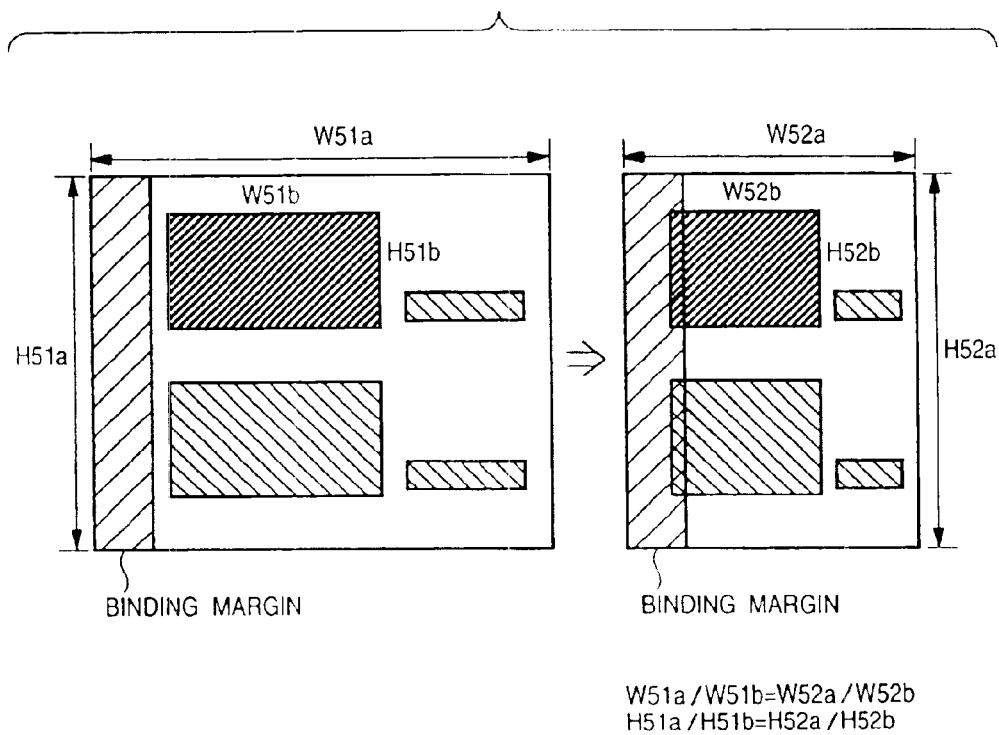
FIG. 2 is a view showing an example wherein the paper size of a template formed from four slots is changed such that the ratio between the paper shape and the shape of each layout constituent element becomes constant.
Figure 3:
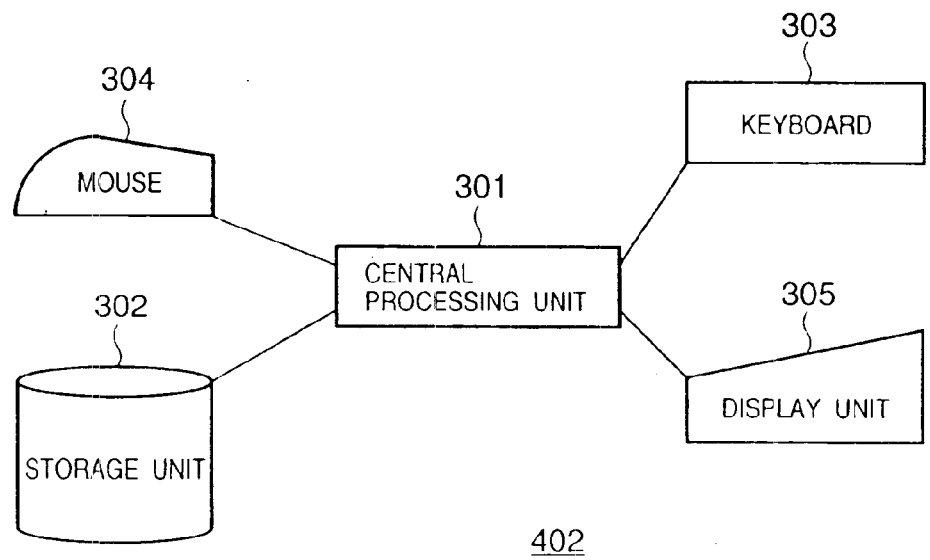
FIG. 3 is a block diagram showing the arrangement of an information processing system to which a document processing method according to an embodiment is applied.

FIG. 3 is a block diagram showing the arrangement of an information processing system to which a document processing method according to an embodiment is applied.

Referring to FIG. 3, a central processing unit 301 includes a CPU for controlling the entire information processing system, a ROM storing the program and control data of the CPU, and a RAM where a work area used by the CPU to execute processing or various tables are defined. A storage unit 302 such as a hard disk stores a template file (to be described later) and the like. A keyboard 303 is used by the user to input various instructions. A mouse 304 is a pointing device for a display unit (to be described later). A display unit 305 displays a template (to be described later) or a menu window.

Figure 4:
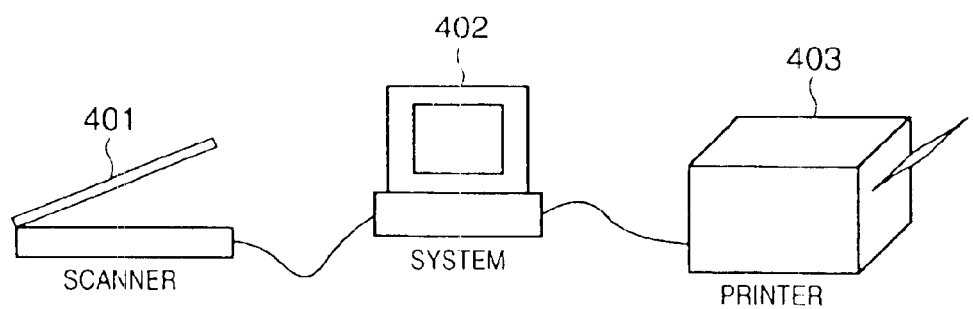
FIG. 4 is a view showing the arrangement of a print service mechanism in the embodiment.

FIG. 4 is a view showing the arrangement of a print service mechanism in the embodiment. The main part of this system has a scanner 401, information processing system 402, and printer 403.

[First Embodiment]

Figure 5:
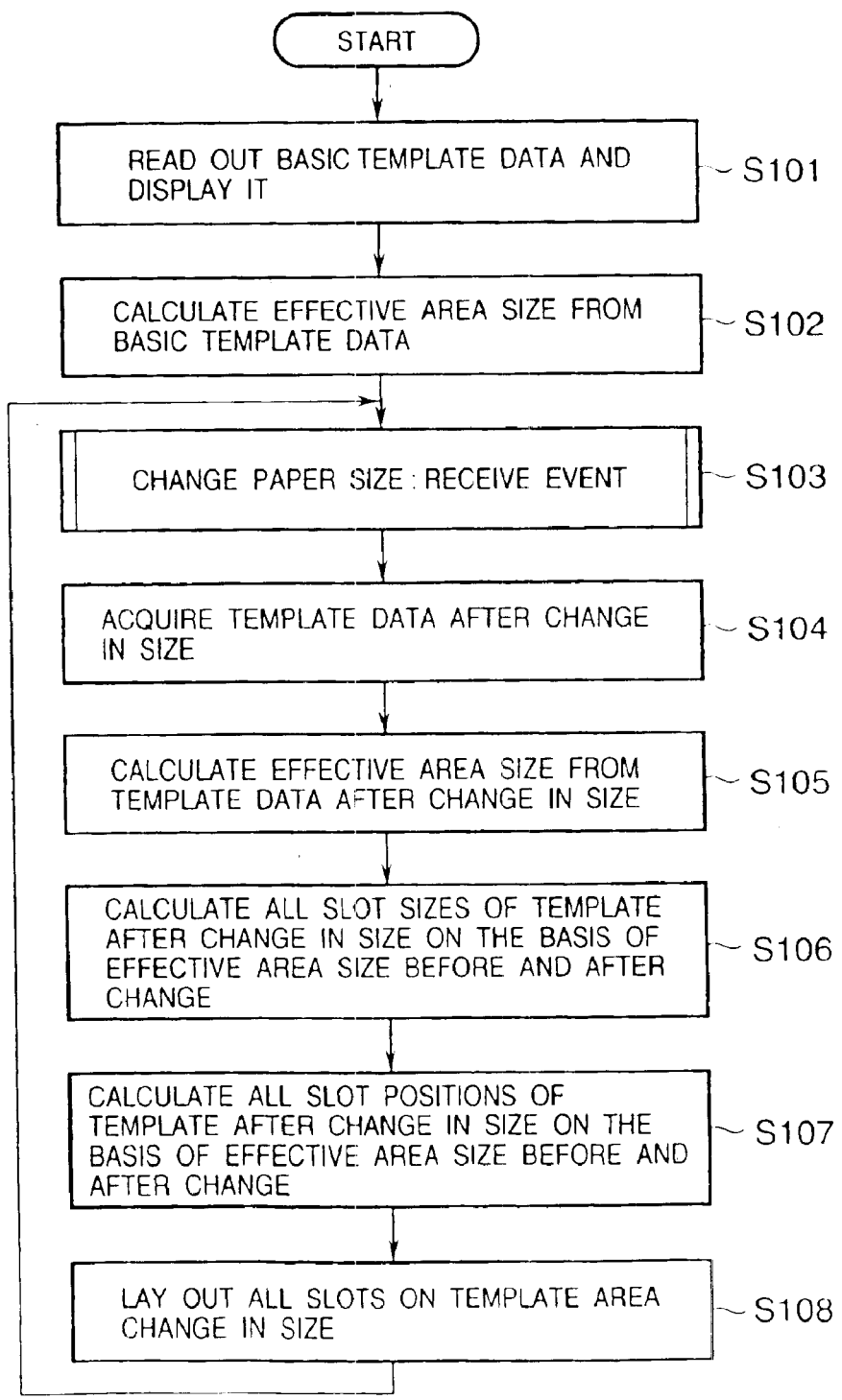
FIG. 5 is a flow chart showing a document processing method according to the first embodiment.

A document processing method according to the first embodiment in the above arrangement will be described. FIG. 5 is a flow chart showing a document processing method according to the first embodiment. In this example, when the user inputs the name of a template to be displayed from the keyboard 303 in the document processing system, the central processing unit 301 receives the input signal, reads out a corresponding template file from the storage unit 302, and displays the template file on the display unit 305.

Figure 6:
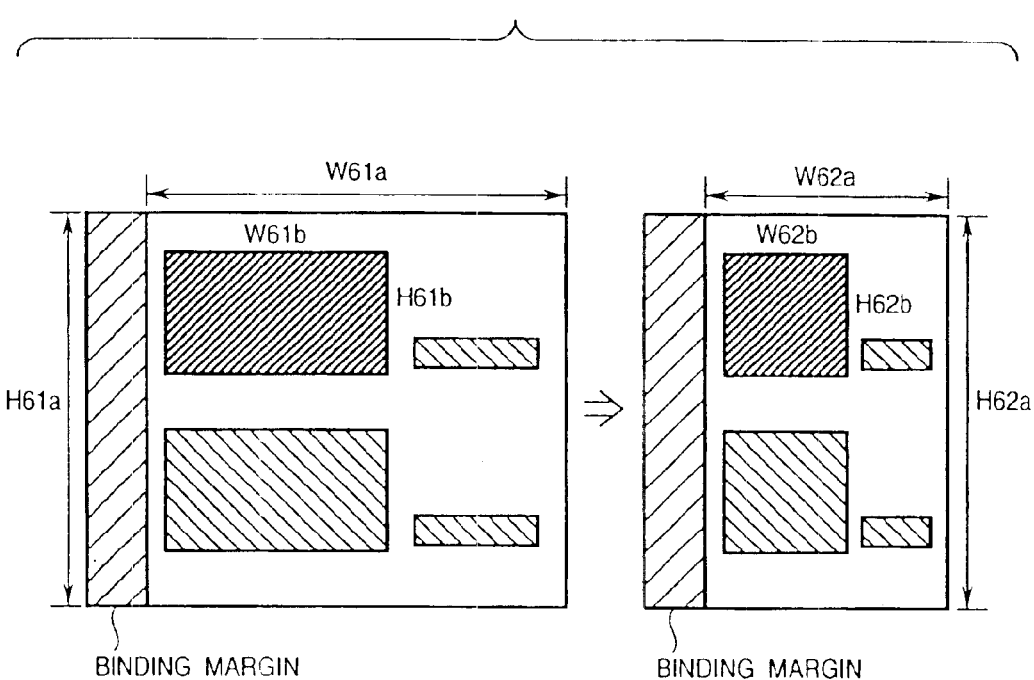
FIG. 6 is a view showing an example of a template in the document processing system.

FIG. 6 is a view showing an example of a template in the document processing system. As shown in FIG. 6, this template has four layout constituent elements (to be referred to as slots hereinafter) in the effective area except the binding margin.

In step S101 shown in FIG. 5, the CPU in the central processing unit 301 reads out a template file corresponding to the template shown in FIG. 6 from the storage unit 302 and transfers the file to the display unit 305 to cause it to display the file. More specifically, as basic data of the template, ① margin sizes (distances from paper edges: left, right, upper, and lower margins), ② paper size (width and height), ③ sizes of the four slots (widths and heights), and ④ positions of the four slots (vectors "left, top coordinates" from the paper origin (upper left corner) to the basic point (upper left corners) of the slots) are read out from the template file and stored in the RAM in the central processing unit 301.

In step S102, the effective area size of the basic template is calculated using the data stored in step S101, and stored in the RAM. More specifically, as the effective area size, the effective area width and height are calculated as follows.

Effective area width ($W61a$) = paper size width −

(left margin + right margin)

Effective area height ($H61a$) = paper size height −

(upper margin + lower margin)

In step S103, when the user inputs a paper size change instruction for the displayed template using the keyboard 303 or mouse 304, paper size change processing starts in accordance with this input signal. The GUI used by the user to set the paper size can have a general design and is not limited to any specific design.

In step S104, the new paper size (width and height) instructed by the user is acquired. The margin sizes are set equal to those read out in step S101. In step S105, the effective area size (width and height) of the new paper is calculated on the basis of the margin data stored in step S101 and the new paper size acquired in step S104. The effective area size of the new paper is calculated as follows.

New effective area width ($W62a$) = new paper size width −

(left margin + right margin)

New effective area height ($H62a$) = new paper size height −

(upper margin + lower margin)

In step S106, new slot sizes are calculated such that the ratio between the effective area size and the size of each slot after the change in size is equal to that before the change. As a new slot size, a new slot width and height are calculated as follows.

New slot width ($W62b$) = previous slot width($W61b$) × new effective area width($W62a$) ÷ previous effective area width($W61a$)

New slot height ($H62b$) = previous slot height($H61b$) × new effective area height($H62a$) ÷ previous effective area height($H61a$)

In step S107, slot start position vectors after the change in size are calculated such that the slot start position vectors before and after the change in size become equal to the magnification of the effective area size. New coordinates are calculated as the slot start position vectors after the change in size as follows.

New coordinate (left) = {previous coordinate (left) − previous left margin} × new effective area width ($W62a$) ÷ previous effective area width ($W61a$) + new left margin

New coordinate (top) = {previous coordinate (top) − previous upper margin} × new effective area height ($H62a$) ÷ previous effective area height ($H61a$) + new upper margin

In step S108, the slots are rearranged on the new template using the new slot sizes and slot start position vectors calculated in steps S106 and S107 and transferred to the display unit 305 to cause it to display the slots. In accordance with a print instruction, the rearranged document is printed out by the printer 403.

As described above, according to the first embodiment, a document processing method is realized using a storage means for storing the paper size and margins of a document and the sizes and positions of all elements in the document, a means for calculating the effective display area size of the document and storing it, a display means for displaying the document held by the storage means, a means for receiving an instruction for changing the document held by the storage means to a different paper size, a means for calculating the effective display area size of the instructed paper size, a means for calculating the sizes of all the constituent elements in the document for the instructed paper size on the basis of the pieces of size information of all the elements in the document, which are held by the storage means, and on the basis of the calculated new effective display area size such that the ratio of a slot size to the effective area size is kept unchanged before and after the change in paper size, a means for calculating the positions of all the constituent elements in the document for the instructed paper size on the basis of the pieces of position information of all the elements in the document, which are held by the storage means, and on the basis of the calculated new effective display area; position such that the ratio of the direction component (P=(Px, Py)) of each vector to the effective area size is kept unchanged before and after the change in paper size, a means for rearranging all the constituent elements in the document in accordance with the calculated sizes and positions of all the constituent elements in the document for the new paper size, and a means for displaying the rearranged document. With this arrangement, the shape of each object frame as a layout constituent element can be freely and easily set without entering the binding margin or the physical printing disable area.

[Modification of First Embodiment]

A document processing method according to a modification of the first embodiment will be described below. In this modification, a new template is added to the basic template group in the storage unit 302 to use the data of the calculated new slot sizes and slot start position vectors as data for paper size change for the next time.

Figure 7:
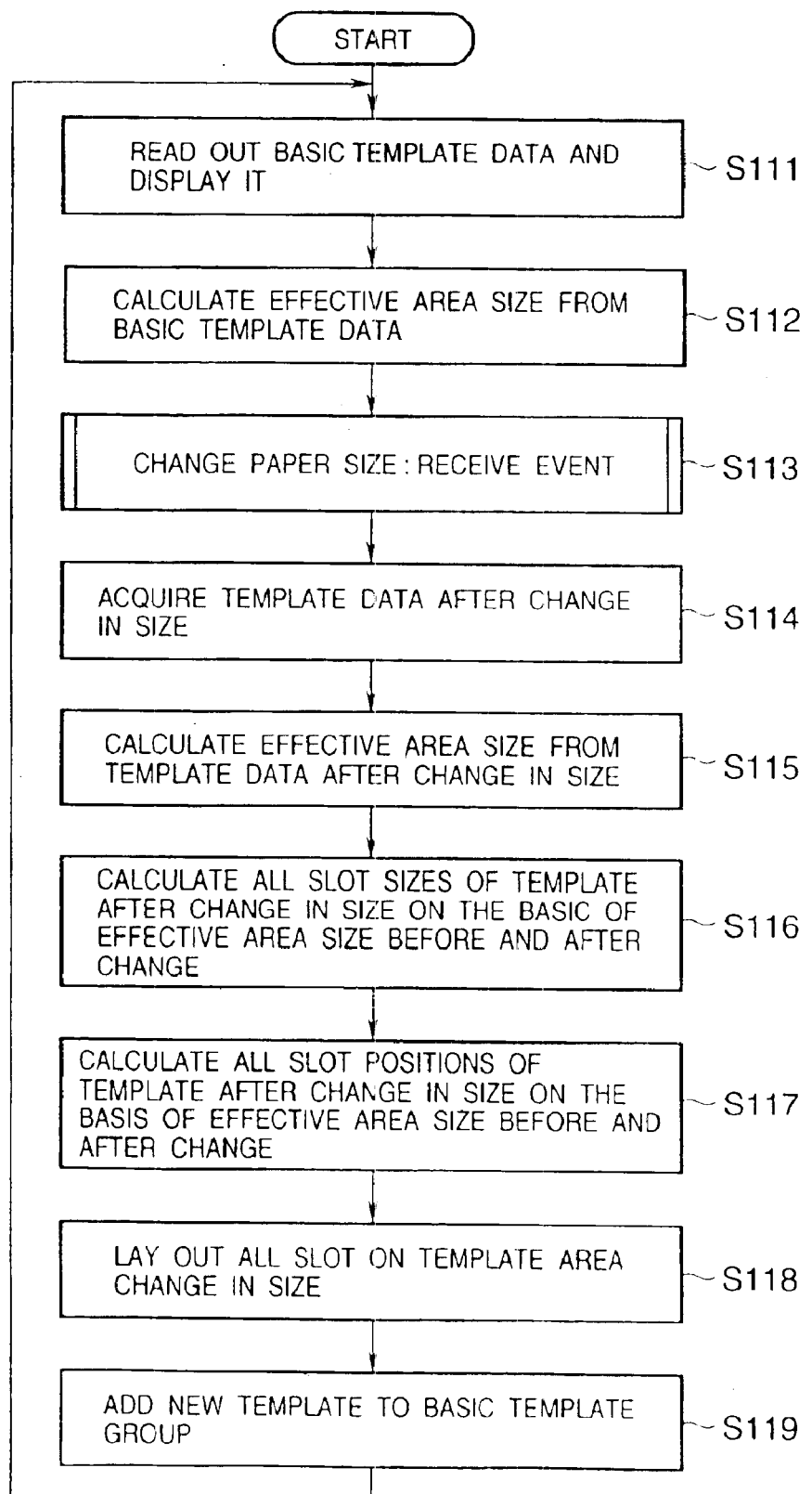
FIG. 7 is a flow chart showing a document processing method according to a modification of the first embodiment.

FIG. 7 is a flow chart showing a document processing method according to a modification of the first embodiment. As shown in FIG. 7, steps S111 to S118 are the same as steps S101 to S108 in FIG. 5. In this modification, in step S119, the calculated new template is added to the basic template group in the storage unit 302 and used for paper size change for the next time.

According to the modification of the first embodiment, when all constituent elements in the document are to be rearranged in accordance with the sizes and positions of all the constituent elements in the document for the new calculated paper size, the previously stored pieces of information including the paper size and margins of the document and the sizes and positions of all the constituent elements in the document are updated in accordance with the paper size and margins of the document and the sizes and positions of all the constituent elements for the new paper size. The document as a reference for deformation can be replaced with not the basic document (initial document) but an immediately preceding displayed document.

[Second Embodiment]

The second embodiment of the present invention will be described next in detail with reference to the accompanying drawings. The information processing system of the second embodiment has the same arrangement as that shown in FIG. 3, and a detailed description thereof will be omitted. A description will be made using the template shown in FIG. 6 as an example.

In the second embodiment, when the paper size is to be changed, the user switches the shapes of layout constituent elements between a mode "keeping the aspect ratios of slots" and a mode "keeping constant margin sizes" in accordance with the purpose.

Figure 8:
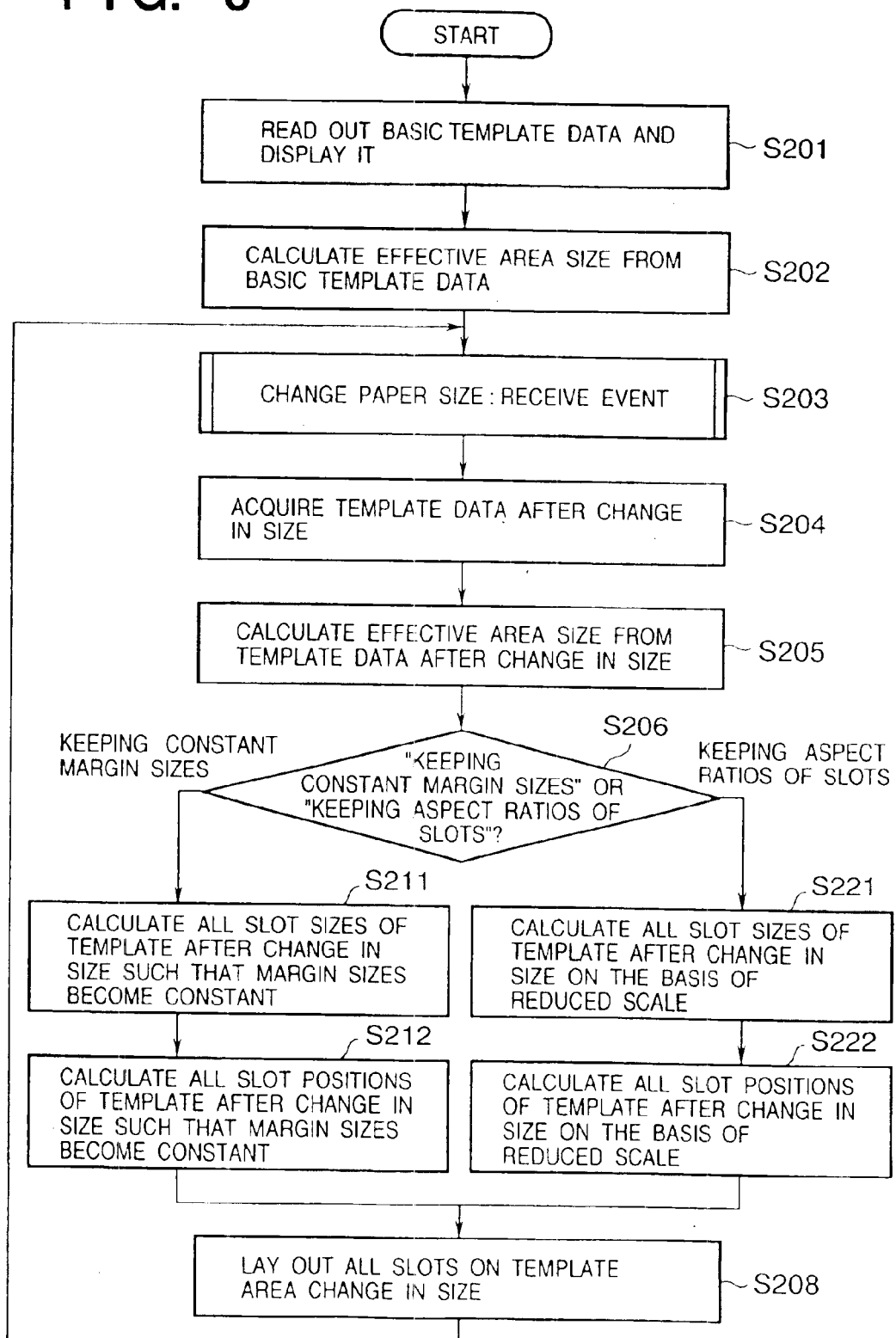
FIG. 8 is a flow chart showing a document processing method according to the second embodiment.

FIG. 8 is a flow chart showing a document processing method according to the second embodiment. As shown in FIG. 8, steps S201 to S205 are the same as steps S101 to S105 in FIG. 5. Before the change in paper size, the user can select the mode for the change in paper size using a GUI as shown in FIG. 9.

Figure 9:
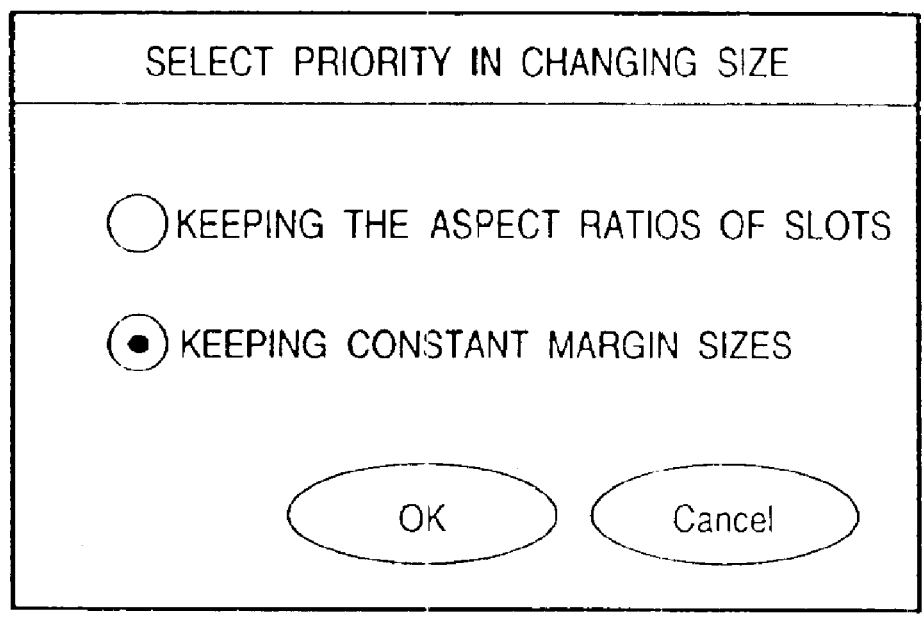
FIG. 9 is a view showing a display example of a dialog box according to the second embodiment.

In step S206 shown in FIG. 8, the CPU in a central processing unit 301 determines whether the user has selected the mode "keeping the aspect ratios of slots" or the mode "keeping constant margin sizes" in the window shown in FIG. 9. When "keeping constant margin sizes", i.e., the mode in which the ratios of slot sizes to the effective area become constant before and after the change is selected, the flow advances to step S211, and the sizes and new coordinates are calculated, as in steps S106 and S107 in FIG. 5.

When "keeping the aspect ratios of slots", i.e., the mode in which the slot shapes remain constant (similar) before and after the change is selected, the flow advances to step S221 to calculate new slots sizes such that the aspect ratios of the slots remain constant before and after the change in size. More specifically, a reduced scale is obtained as follows, and the sizes are calculated on the basis of the reduced scale.

$$\text{Reduced scale} = \text{Min}\{\text{new effective area width }(W42a) \div \\ \text{previous effective area width }(W41a), \\ \text{new effective area height }(H42a) \div \\ \text{previous effective area height }(H41a)\}$$

$$\text{New slot width }(W42b) = \text{previous slot width }(W41b) \times \\ \text{reduced scale}$$

$$\text{New slot height }(H42b) = \text{previous slot height }(H41b) \times \\ \text{reduced scale}$$

In step S222, new slot positions are calculated on the basis of the reduced scale obtained in step S221.

$$\text{New coordinate (left)} = \{\text{previous coordinate (left)} - \\ \text{previous left margin}\} \times \\ \text{reduced scale} + \\ \text{new left margin}$$

$$\text{New coordinate (top)} = \{\text{previous coordinate (top)} - \\ \text{previous upper margin}\} \times \\ \text{reduced scale} + \\ \text{new upper margin}$$

The slots are rearranged on the new template using the sizes and position information calculated in steps S211 and S212 or S221 and S222, and displayed on a display unit 305.

According to the second embodiment, a document processing apparatus scheme is realized, which has, as a characteristic feature, the step of asking the user for priority in deforming constituent elements when an instruction for changing the document to a different paper size is received. When the paper size is to be changed, the user switches the shapes of layout constituent elements between the mode "keeping the aspect ratios of slots" and the mode "keeping constant margin sizes" in accordance with the purpose.

[Application Example of First Embodiment]

An application example of the first embodiment will be described in detail with reference to the accompanying drawings. The print service mechanism of this application example has the same arrangement as that shown in FIG. 4. A printer 403 has a double-side printing mechanism. The information processing system has the same arrangement as that shown in FIG. 3. A display unit 305 corresponds to the printer 403 having the double-side printing mechanism. The information processing system has already prepared a printer driver and the like sufficient for use of the double-side printing mechanism.

Figure 10:
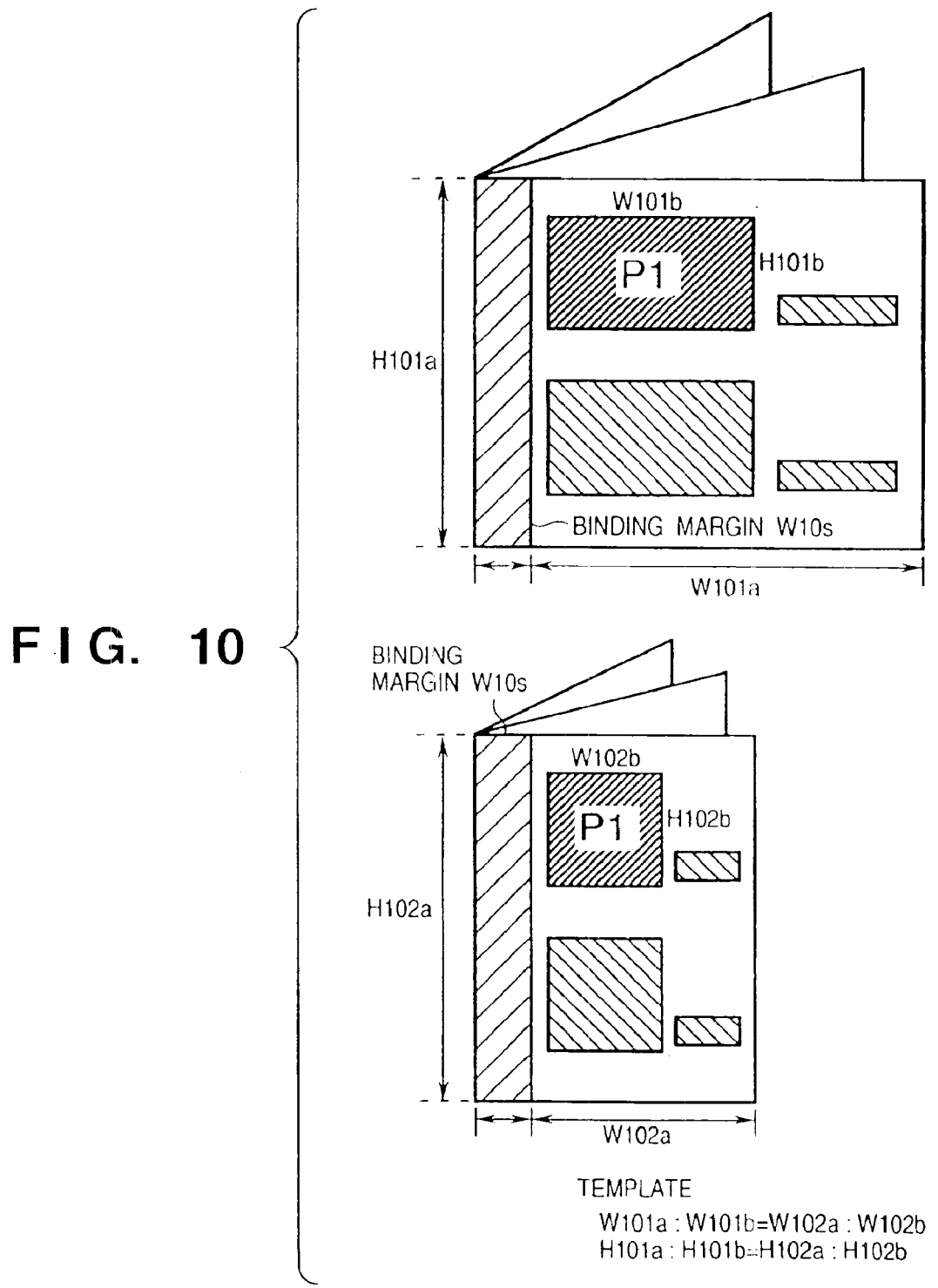
FIG. 10 is a view showing an example of a template used in an application example of the first embodiment.

FIG. 10 is a view showing an example of a template used in an application example of the first embodiment. This template is obtained by continuously binding a plurality of pages of the template shown in FIG. 6, which is used in the description of the first embodiment. This template has four slots in the effective display area, and all margins other than the left margin (binding margin=W10s) are 0.

Figure 11:
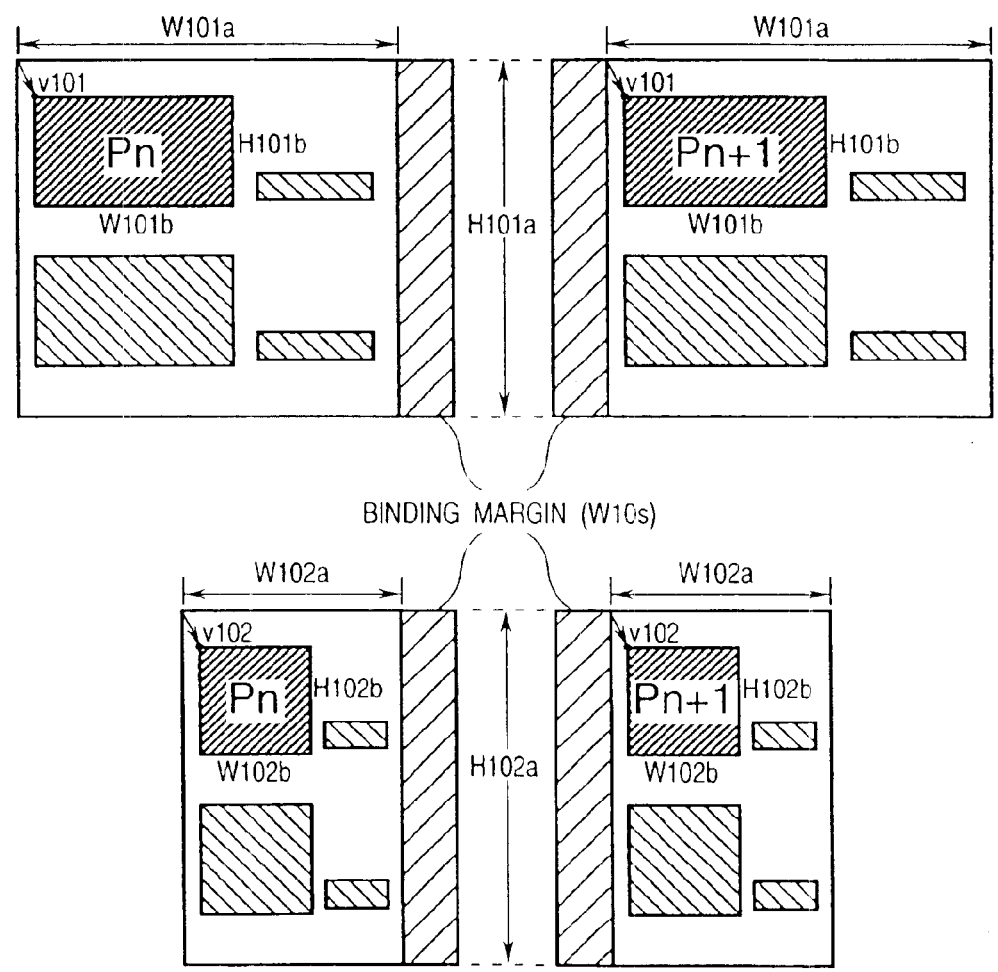
FIG. 11 is a view showing an output example when the template shown in FIG. 10 is double-side-printed.

FIG. 11 shows an output example (the nth page and the (n+1)th page following the nth page) when the template shown in FIG. 10 is double-side-printed by the printer 403. In the double-side printing output, the size of the effective display area (area obtained by excluding the upper, lower, left, and right margins from the entire paper) on the upper surface is the same as that on the lower surface. However, in double-side printing, the central portion of the spread is used as the binding margin, as shown in FIG. 11. Hence, the left and right or upper and lower margin amounts change depending on the position of the binding margin.

Oblong Binding

The upper and lower margin amounts on the upper surface are the same as those on the lower surface. However, the right margin amount on the upper surface corresponds to the left margin amount on the lower surface. The left margin amount on the upper surface corresponds to the right margin amount on the lower surface . . . (a)

Longwise Binding

The left and right margin amounts on the upper surface are equal to those on the lower surface. However, the upper margin amount on the upper surface corresponds to the lower margin amount on the lower surface. The lower margin amount on the upper surface corresponds to the upper margin amount on the lower surface . . . (b)

In double-side printing, the effective display area size on the upper surface is the same as that on the lower surface, and the display position changes depending on the margin positions (when the upper left coordinates of the effective display area are obtained with reference to the upper left corner of the paper, start position vectors change). When step S107 of the first embodiment is performed in consideration of these characteristics, the first embodiment can be applied to double-side printing.

Equations ① and ② for obtaining the rearrangement position (vector "left, top coordinates" from the paper origin (upper left corner) to the basic point (upper left corner) of the slot of each slot before and after the change in paper size in the first embodiment are applied to the nth and (n+1)th surfaces in double-side printing.

Paper origin: upper left corner of the paper, basic point of a slot: upper left corner of the slot $$\text{New coordinate (left')} = \{\text{previous coordinate (left)} - \qquad ①$$
$$\text{previous left margin}\} \times$$
$$\text{new effective width} +$$
$$\text{previous effective width} +$$
$$\text{new left margin}$$

$$\text{New coordinate (top')} = \{\text{previous coordinate (top)} - \qquad ②$$
$$\text{previous upper margin}\} \times$$
$$\text{new effective height} \div$$
$$\text{previous effective height} +$$
$$\text{new upper margin}$$

Since the effective display area size on the upper surface equals that on the lower surface, the same values can be used as the previous effective width, previous effective height, new effective width, and new effective height in equations ① and ② for the nth and (n+1)th surfaces. In FIG. 11, the values areas follows.

Previous effective width=$W101a$

Previous effective height=$H101a$

New effective width=$W101b$

New effective height=$H101b$ ③

Because of (a), the margin amount changes between the upper and lower surfaces. In FIG. 11, the margin amounts are as follows.

Template: ④-1
left margin = $W10s$
right margin = 0
upper and lower margins = 0

Nth surface: ④-2
left margin = 0
right margin = $W10s$
upper and lower margins = 0

(N + 1)th surface: ④-3
left margin = $W10s$
right margin = 0
upper and lower margins = 0

On the basis of conditions ④, the previous left margin and new left margin, and the previous upper margin and new upper margin in coordinate conversion for rearranging the previous coordinates (left, top) on the template at the new coordinates (left', top') on the nth and (n+1)th surfaces are obtained as follows.

Nth surface: ⑤
previous left margin = $W10s$
previous upper margin = 0
new left margin = 0
new upper margin = 0

(N + 1)th surface: ⑥
previous left margin = $W10s$
previous upper margin = 0
new left margin = $W10s$
new upper margin = 0

Since the start position (v101, v102) of each slot in the effective display area on the upper surface is the same as that on the lower surface, the start position vector of each slot after the change in paper size in FIG. 11 can be, W obtained by substituting conditions ③, ⑤, and ⑥ into equations ① and ②.

Nth surface:

$$\text{New coordinate (left')} = \{\text{previous coordinate (left)} -$$
$$\text{previous left margin } (W10s)\} \times$$
$$\text{new effective width } (W102a) +$$
$$\text{previous effective width } (W101a) +$$
$$\text{new left margin } (0)$$
$$= (\text{left} - W10s) \times W102a + W101a$$

$$\text{New coordinate (top')} = \{\text{previous coordinate (top)} -$$
$$\text{upper margin } (0)\} \times$$
$$\text{new effective height } (H102a) +$$
$$\text{previous effective height } (H101a) +$$
$$\text{upper margin } (0)$$
$$= \text{top} \times H102a + H101a$$

(N+1)th surface:

$$\begin{aligned} \text{New coordinate (left')} &= \{\text{previous coordinate (left)} - \\ &\quad \text{previous left margin } (W10s)\} \times \\ &\quad \text{new effective width } (W102a) \div \\ &\quad \text{previous effective width } (W101a) + \\ &\quad \text{new left margin } (W10s) \\ &= (\text{left} - W10s) \times W102a \div W101a + W10s \end{aligned}$$

$$\begin{aligned} \text{New coordinate (top')} &= \{\text{previous coordinate (top)} - \\ &\quad \text{upper margin } (0)\} \times \\ &\quad \text{new effective height } (H102a) \div \\ &\quad \text{previous effective height } (H101a) + \\ &\quad \text{upper margin } (0) \\ &= \text{top} \times H102a \div H101a \end{aligned}$$

When the slots after the change in paper size are rearranged using the new slot sizes calculated by the method described in the first embodiment and the slot start position vectors calculated above, and transferred to the display-unit 305, a satisfactory double-side printing output can be obtained.

The binding direction or margin amounts used in the description are merely examples and are not limited to the values described above.

The present invention is not limited in association with the structure of internal data for drawing in double-side printing and various hardware arrangements for double-side printing.

(Other Embodiments)

The design of the dialog box shown in FIG. 9 is merely an example and is not particularly limited to the window shown in FIG. 9.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magneto optical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion-board inserted into the computer or a function expansion unit connected to the computer, and the CPU of the function expansion board or function expansion unit performs part or all of actual processing on the basis of the instructions of the program codes.

As has been described above, when the paper size of a document is to be changed, layout constituent elements are rearranged while keeping margin sizes unchanged and keeping a predetermined ratio between the shape of the effective area and the shape of each layout constituent element, thereby freely and easily setting the shape of each object frame as a layout constituent element without entering the binding margin or the physical printing disable area.

In addition, when the paper size is changed, the user can switch the shapes of layout constituent elements between the mode "priority of the slot shapes of the original document" and the mode "priority of a predetermined ratio between the effective area and the slots" in accordance with the purpose, so the convenience for the user can be improved.

As many apparently widely different embodiments of the present invention can be made without departing from the spirit and scope thereof, it is to be understood that the invention is not limited to the specific embodiments thereof except as defined in the appended claims.

What is claimed is:

1. A document processing apparatus for rearranging, in a document, a plurality of layout constituent elements representing frames into which a plurality of images is inserted, said apparatus comprising:

providing means for providing a template comprising a paper size, a margin, and an area excluding the margin, the template having a plurality of layout constituent elements arranged in the area excluding the margin;

first changing means for changing the paper size while maintaining the margin, thereby changing an effective area from a previous effective area to a new effective area, wherein:

new effective area width=new paper size width−(left margin+right margin), new effective area height=new paper size height−(upper margin+lower margin), previous effective area width=previous paper size width−(left margin+right margin), and previous effective area height=previous paper size height−(upper margin+lower margin);

second changing means for changing the width and height of each of the plurality of layout constituent elements based on the changed area excluding the margin, thereby changing the aspect ratio of the plurality of layout constituent elements, wherein:

new width of layout constituent element=previous width of layout constituent element×new effective area width÷previous effective area width, and new height of layout constituent element=previous height of layout constituent element×new effective area height÷previous effective area height; and rearranging means for rearranging a layout of the plurality of layout constituent elements changed by said second changing means in the area excluding the margin such that the plurality of layout constituent elements are arranged at positions having a left coordinate and a top coordinate calculated according to:

new left coordinate=(previous left coordinate−left margin before the paper size change)×new effective area width÷previous effective area width+new left margin new top coordinate=(previous top coordinate−previous upper margin)×new effective area height÷previous effective area height+new upper margin, wherein the previous left coordinate and the previous top coordinate are the left and top coordinates, respectively, of the plurality of layout constituent elements on the template before said first changing means changes the paper size.

2. The document processing apparatus according to claim 1, further comprising calculation means for calculating (i) a height and a vertical position of each layout constituent element on the basis of a ratio between the height of the effective area before the change in paper size and that after the change in paper size, and (ii) a width and a horizontal position of each layout constituent element on the basis of a ratio between the width of the effective area before the change in paper size and that after the change in paper size.

3. The document processing apparatus according to claim 2, further comprising means for storing a calculation result of said calculation means.

4. The document processing apparatus according to claim 2, further comprising output means for rearranging each layout constituent element in accordance with the size and position calculated by said calculation means and for outputting the layout.

5. The document processing apparatus according to claim 4, wherein said output means comprises a printer for printing paper.

6. A document processing method for rearranging, in a document, a plurality of layout constituent elements representing frames into which a plurality of images is inserted, said method comprising:

a providing step of providing a template comprising a paper size, a margin, and an area excluding the margin, the template having a plurality of layout constituent elements arranged in the area excluding the margin;

a first changing step of changing the paper size while maintaining the margin, thereby changing the effective area from a previous effective area to a new effective area, wherein:

new effective area width=new paper size width−(left margin+right margin), new effective area height=new paper size height−(upper margin+lower margin), previous effective area width=previous paper size width−(left margin+right margin), and previous effective area height=previous paper size height−(upper margin+lower margin);

a second changing step of changing the width and height of each of the plurality of layout constituent elements based on the changed area excluding the margin, thereby changing the aspect ratio of the plurality of layout constituent elements, wherein:

new width of layout constituent element=previous width of layout constituent element×new effective area width÷previous effective area width, and new height of layout constituent element=previous height of layout constituent element×new effective area height÷previous effective area height; and a rearranging step of rearranging a layout of the plurality of layout constituent elements changed by said second changing means in the area excluding the margin such that the plurality of layout constituent elements are arranged at positions having a left coordinate and a top coordinate calculated according to:

new left coordinate=(previous left coordinate−left margin before the paper size change)×new effective area width÷previous effective area width+new left margin new top coordinate=(previous top coordinate−previous upper margin)×new effective area height÷previous effective area height+new upper margin, wherein the previous left coordinate and the previous top coordinate are the left and top coordinates, respectively, of the plurality of layout constituent elements on the template before the paper size is changed in said first changing step.

* * * * *

UNITED STATES PATENT AND TRADEMARK OFFICE
CERTIFICATE OF CORRECTION

PATENT NO.        : 6,879,943 B1
APPLICATION NO. : 09/425733
DATED              : April 12, 2005
INVENTOR(S)      : Yuriyo Shigemori It is certified that error appears in the above-identified patent and that said Letters Patent is hereby corrected as shown below:

Drawings,
Sheet 6 of 10, Figure 7, in S118, "SLOT" should read -- SLOTS --.

Column 4,
Line 7, "(W62a) +" should read -- (W62a) ÷ --.
Line 11, "(H62a) +" should read -- (H62a) ÷ --.

Column 6,
Line 6, "(w42a) +" should read -- (W42a ) ÷ --.

Column 7,
Line 44, "width +" should read -- width ÷ --.
Line 60, "areas" should read -- are as --.

Column 8,
Line 55, "(W102a) +" should read -- (W102a) ÷ --.
Line 58, "W102a +" should read -- W102a ÷ --.
Line 62, "(H102a) +" should read -- (H102a) ÷ --.
Line 65, "H102a +" should read -- H102a ÷ --.

Column 9,
Line 5, "(W102a) +" should read -- (W102a) ÷ --.
Line 8, "W102a +" should read -- W102a ÷ --.
Line 13, "(H102a) +" should read -- (H102a) ÷ --.
Line 16, "H102a +" should read -- H102a ÷ --.

UNITED STATES PATENT AND TRADEMARK OFFICE
CERTIFICATE OF CORRECTION

PATENT NO. : 6,879,943 B1
APPLICATION NO. : 09/425733
DATED : April 12, 2005
INVENTOR(S) : Yuriyo Shigemori It is certified that error appears in the above-identified patent and that said Letters Patent is hereby corrected as shown below:

Column 12,
Line 30, "height–previous" should read -- height÷previous --.
Line 31, "height÷new" should read -- height+new --.

Signed and Sealed this

Eleventh Day of July, 2006

JON W. DUDAS
*Director of the United States Patent and Trademark Office*